US009695866B2

(12) United States Patent
Jiang et al.

(10) Patent No.: US 9,695,866 B2
(45) Date of Patent: Jul. 4, 2017

(54) METHOD FOR MANUFACTURING COMPOSITE DOUBLE-METAL FRACTURE SPLITTING CONNECTING ROD

(71) Applicant: JIANGSU UNIVERSITY, Zhenjiang, Jiangsu (CN)

(72) Inventors: Wenfan Jiang, Jiangsu (CN); Yinfang Jiang, Jiangsu (CN)

(73) Assignee: JIANGSU UNIVERSITY, Zhenjiang, Jiangsu (CN)

( * ) Notice: Subject to any disclaimer, the term of this patent is extended or adjusted under 35 U.S.C. 154(b) by 70 days.

(21) Appl. No.: 14/394,692

(22) PCT Filed: Oct. 24, 2012

(86) PCT No.: PCT/CN2012/083415
§ 371 (c)(1),
(2) Date: Oct. 15, 2014

(87) PCT Pub. No.: WO2013/155826
PCT Pub. Date: Oct. 24, 2013

(65) Prior Publication Data
US 2015/0053363 A1   Feb. 26, 2015

(30) Foreign Application Priority Data

Apr. 17, 2012   (CN) .......................... 2012 1 0111190

(51) Int. Cl.
*F16C 7/02*   (2006.01)
*F16C 9/04*   (2006.01)
(Continued)

(52) U.S. Cl.
CPC ............ *F16C 7/023* (2013.01); *B22D 19/009* (2013.01); *B22D 19/04* (2013.01); *B22D 19/16* (2013.01);
(Continued)

(58) Field of Classification Search
CPC . F16C 7/02; F16C 7/023; F16C 9/045; B22D 7/02; B22D 19/0081; B22D 19/009; B22D 19/04; B22D 19/06; B22D 19/16
(Continued)

(56) References Cited

U.S. PATENT DOCUMENTS 179,212 A  *  6/1876  McDonald .............. B22D 19/16
                                                164/93
2,244,367 A  *  6/1941  Kinkead ......................... 164/93
(Continued)

FOREIGN PATENT DOCUMENTS

CN         1562528 A   *   1/2005
CN       100425848 C       10/2008
(Continued)

OTHER PUBLICATIONS

Machine translation of CN 102626777A, published Aug. 8, 2012.*

*Primary Examiner* — Kevin E Yoon
*Assistant Examiner* — Jacky Yuen
(74) *Attorney, Agent, or Firm* — Novick, Kim & Lee, PLLC; Allen Xue

(57) ABSTRACT

The present invention provides a method for manufacturing a composite double-metal fracture splitting connecting rod, comprising the steps of: providing a moveable spacer at a large end of a mold cavity of a connecting rod, to divide the mold cavity into two separate parts; casting a connecting rod body and a connecting rod cap with material for the main body of the connecting rod; removing the spacer from the mold cavity when the majority of the material is solidified, then injecting material for a fracture splitting region into an empty mold cavity obtained after the removal of the spacer, and metallurgically bonding the two types of material to form a composite double-metal casting; then, separating the connecting rod body from the connecting rod cap by a fracture splitting apparatus along preset fracture surfaces;

(Continued)

and positioning and accurately assembling through engaged staggered structures on the two fracture surfaces.

9 Claims, 3 Drawing Sheets

(51) Int. Cl.
    *B22D 19/04*     (2006.01)
    *B22D 19/16*     (2006.01)
    *B22D 21/00*     (2006.01)
    *C22C 21/00*     (2006.01)
    *C22C 21/02*     (2006.01)
    *C22C 21/14*     (2006.01)
    *C22C 21/16*     (2006.01)
    *C22C 21/18*     (2006.01)
    *B22D 19/00*     (2006.01)

(52) U.S. Cl.
    CPC ............ *B22D 21/007* (2013.01); *C22C 21/00* (2013.01); *C22C 21/02* (2013.01); *C22C 21/14* (2013.01); *C22C 21/16* (2013.01); *C22C 21/18* (2013.01); *F16C 9/045* (2013.01); *F16C 2220/06* (2013.01)

(58) Field of Classification Search
    USPC ............ 29/888.09–888.092; 164/93–96, 111
    See application file for complete search history.

(56) References Cited

U.S. PATENT DOCUMENTS

| | | | | |
|---|---|---|---|---|
| 3,433,284 A | * | 3/1969 | Williams | B22D 19/00 164/111 |
| 3,978,566 A | * | 9/1976 | Ladin | 29/898.066 |
| 4,884,900 A | * | 12/1989 | Pirault et al. | 384/434 |
| 4,934,442 A | * | 6/1990 | Futamura | C22C 21/02 148/550 |
| 5,826,331 A | * | 10/1998 | Myers et al. | 29/888.09 |
| 2002/0148325 A1 | | 10/2002 | Bergsma | |

FOREIGN PATENT DOCUMENTS

| | | | | |
|---|---|---|---|---|
| CN | 201133417 Y | * | 10/2008 | |
| CN | 101307796 A | | 11/2008 | |
| CN | 101387314 A | | 3/2009 | |
| CN | 201218271 Y | | 4/2009 | |
| CN | 101643870 A | * | 2/2010 | |
| CN | 101444884 B | | 12/2010 | |
| CN | 102626777 A | | 8/2012 | |
| DE | 102005015186 A1 | * | 10/2006 | ............ B22D 19/16 |
| GB | 2296752 A | | 7/1996 | |
| JP | 62093060 A | * | 4/1987 | |
| JP | H1162945 A | | 3/1999 | |
| JP | 2000110825 A | | 4/2000 | |

* cited by examiner

METHOD FOR MANUFACTURING COMPOSITE DOUBLE-METAL FRACTURE SPLITTING CONNECTING ROD

TECHNICAL FIELD

The present invention relates to a method for manufacturing a composite double-metal fracture splitting connecting rod, belonging to the manufacturing field of engine parts.

BACKGROUND OF THE INVENTION

As one of key parts of engines, connecting rods during their operating processes mainly bear tension, compression, bending and other high frequency alternating loads resulted from combustion explosive force and reciprocating inertial force. Due to poor working conditions and complicated motion states, the service life of the connecting rods is affected by fatigue, abrasion, vibration and the like. Therefore, the connecting rods must have high enough strength, rigidity and comprehensive mechanical properties.

Conventional connecting rods are machined separately. After a blank of a connecting rod is forged integrally, bonding surfaces of a connecting rod body and a connecting rod cap are machined by sawing, milling, grinding and other methods. After a positioning pin hole of the connecting rod cap and a bolt hole of the connecting rod body are machined finely, the connecting rod cap and the connecting rod body are assembled together. The conventional methods have the disadvantages of redundant working procedures, low efficiency, high reject rate, and low bearing capacity and quality stability. At present, the connecting rod fracture splitting technology is the most promising machining technology in the manufacturing field of connecting rods. However, this fracture splitting technology has high requirements on the properties of material for connecting rods. The toughness of the material for connecting rods is restricted under premise of maintaining its strength, and the fractures are required to show a brittle fracture characteristic. Common material for engineering-purpose fracture splitting connecting rods is limited to powder forged material, high-carbon steel, nodular cast iron and malleable cast iron. The rigorous preparation conditions and high cost of such material limit the application and promotion of the connecting rod fracture splitting technology.

Patent No. 200820040497.X, entitled "Fracture Splitting Connecting Rod Blanks for Engines", proposed that the powder forged material, nodular cast iron, 70 high-carbon steel or C70S6 high-carbon steel is used as material for a connecting rod, a blank of the connecting rod is molded by forging, and the connecting rod is fractured by means of fracture splitting after a stress groove is pre-machined on the inside of a large end hole of the connecting rod. Such a connecting rod has strict requirements on the strength and toughness of material, and the rigorous material preparation conditions and high cost thereof limit the application and promotion of the fracture splitting technology.

Patent No. 200580013038.1, entitled "Connecting Rods and Manufacturing Method thereof", proposed that a segmented region of a large end portion of a connecting rod is irradiated by laser or plasma and then cooled in vacuum, so that material for the segmented region becomes martensite from austenite; and the martensite suffers brittle fracture due to fracture loads, as a result, the connecting rod body is separated from the connecting rod cap. The biggest problem of this process is that the region irradiated by laser or plasma cannot be controlled effectively. In this case, parts in the vicinity of the fracture region, in addition to the fracture region, are also embrittled. Consequently, the local mechanical strength of the connecting rod is decreased, and the fracture splitting of the connecting rod at a predetermined segmented part cannot be ensured effectively so that the fracture surfaces are likely to have offsets or other problems. This process is thus not suitable for other materials.

Patent No. 200710300307.3, entitled "Cryogenic Embrittlement Fracture Splitting Process for High-strength Alloy Steel Connecting Rods", proposed that a connecting rod is put into liquid nitrogen for copiously cooling for more than 5 min to change the ductility of the material, so that the connecting rod becomes brittle and the brittle fracture of the connecting rod is thus realized. In this process, embrittling the whole connecting rod makes the connecting rod in a risk of decreased mechanical strength; and as the brittleness of the connecting rod increases, a large fracture load is required to segment the large end portion of the connecting rod. This makes a fracture apparatus itself large in scale and increases the equipment investments. This process is thus not suitable for other materials.

American No. US20020148325A1, entitled "Semi-solid Formed, Low Elongation Aluminum Alloy Connecting Rod", proposed that a blank of a connecting rod is manufactured by a semi-solid forming technology, and then the toughness of the aluminum alloy connecting rod is adjusted by quenching heat treatment and artificial aging to make the aluminum alloy connecting rod meet technical requirements of the fracture splitting machining. Such a connecting rod has the following disadvantages: the preparation process of the semi-solid aluminum alloy raw material is complicated and high in cost, too large or too small crystalline grains formed after cooling will affect the toughness of the connecting rod, and the subsequent heat treatment has complex influence on the performance of the connecting rod. Consequently, it is likely to have problems during fracture splitting the connecting rod, such as torn large end, fracture splitting insufficiency, dregs and deformed fracture surfaces.

To overcome the problems and deficiencies in the above manufacturing processes of fracture splitting connecting rods, the present invention provides a method for manufacturing a composite double-metal fracture splitting connecting rod. By the composite technology, two metals of different physical, chemical and mechanical properties are metallurgically bonded at an interface to form an integral composite casting. This method compensates the deficiencies of each component material, integrates the advantages of each kind of material and realizes the diversity of the overall performance. As the connecting rod body is made of high-strength, high-toughness and high-quality material and the fracture splitting region at the large end portion of the connecting rod is made of fracture splitting material, the connecting rod is allowed to have high strength and anti-fatigue performance whilst maintaining sufficient rigidity and toughness and meets the requirements of fracture splitting division due to an external load. With the naturally staggered structures on the two fracture surfaces, repositioning and accurately assembling the separated connecting rod body and the connecting rod cap are ensured. Furthermore, the connecting rod, as without requiring mechanically machining any fitting surfaces, has high bearing capacity and high assembly accuracy.

SUMMARY OF THE INVENTION

A technical problem to be solved by the present invention is that the material for a fracture splitting connecting rod is less in optional type, difficult in preparation and high in cost.

The present invention employs the following technical solution. When a blank of a fracture splitting connecting rod is to be manufactured, a fracture splitting layer is formed in a fracture splitting region and filled with material different from that for the main body of the connecting rod, the blank of the fracture splitting connecting rod is manufactured, and a fracture splitting process is then performed in the fracture splitting layer. Two different metals are metallurgically bonded. The resulting composite connecting rod has excellent comprehensive performance, and the fracture splitting region thereof meets the technical requirements of the fracture splitting machining.

By providing a moveable spacer inside a mold cavity of the connecting rod at a position where the connecting rod body and a connecting rod cap are connected to each other, the mold cavity is divided into two separate parts; the connecting rod body and the connecting rod cap are cast first; the spacer is removed from the mold cavity when the majority of material is solidified; then, material for a fracture splitting region is injected into an empty mold cavity obtained after the removal of the spacer, to fill the empty mold cavity under the gravity or pressure; and the two types of material are metallurgically bonded to form a composite casting.

The spacer provided in the mold cavity of the connecting rod is 1 mm-50 mm thick. A preheating temperature of the spacer, a casting temperature of the two metals and a time interval for casting the two metals are determined, according to a volume ratio and a contact area of the two cast metals, under the consideration of melting points of the two metals. These process parameters are selected based on the following principles: the preheating temperature of the spacer should be appropriately matched with the casting temperature of the material for the main body of the connecting rod, the casting temperature of the metals should be avoided too high to burn or damage the surface of the spacer, or, the preheating temperature should be avoided too low to make the molten metal in contact with the spacer cool too quickly to influence the metallurgical bonding quality of the composite layer. The time interval for casting the two metals is directly related to the temperature of the previously cast metal and the size of the casting, and is determined by the solidification time of the material for the main body of the connecting rod.

During fracture splitting machining, a fracture splitting notch is first formed in the fracture splitting material region at the large end portion of the connecting rod, according to a specific position of the fracture splitting material region at the large end portion of the connecting rod, the fracture splitting notch may be provided at a position close to an intermediate plane of the fracture splitting material region or provided at a position close to a bonding interface of the two types of material; then, by means of fracture splitting, the connecting rod body is completely separated from the connecting rod cap in the fracture splitting material region by a fracture splitting apparatus, to form two fracture surfaces having staggered structures which are engaged to each other; positioning and accurately assembling the connecting rod body and the connecting rod cap through the engaged staggered structures on the two fracture surfaces.

Before performing fracture splitting machining for the blank of the double-metal fracture splitting connecting rod casting, the blank of the connecting rod may be forged thus to eliminate the casting defects, make the structure compact and improve the mechanical properties of the connecting rod.

The spacer may be designed to be planar or jagged, depending upon a specific application scenario of the connecting rod. As a connecting rod for high-power engines is required to bear high load and large torque, when a blank of a fracture splitting connecting rod is to be manufactured, a spacer with a jagged surface is provided in a mold cavity of a mold, so that a jagged bonding interface is formed between two types of material. During the implementation of the fracture splitting process, the fracture splitting notch is formed at a position close to the bonding interface of the connecting rod, and the connecting rod body is separated from the connecting rod cap by means of fracture splitting along the preset interface due to an external load, so that naturally and approximately jagged structures are formed on the two fracture surfaces. By mutual engaging and positioning of these jagged structures, the connecting rod body and the connecting rod cap are accurately assembled. Due to large contact area and high positioning accuracy of the connecting rod body and the connecting rod cap, the bearing capacity and the quality stability of the connecting rod are improved greatly.

The present invention includes the following specific steps:

(A) providing a moveable spacer inside a mold cavity of the connecting rod at a position where the connecting rod body and a connecting rod cap are connected to each other, to divide the mold cavity of the connecting rod into two separate parts;

(B) casting the connecting rod body and the connecting rod cap;

(C) removing the spacer from the mold cavity when the majority of material of the connecting rod body and the connecting rod cap is solidified, then injecting the molten fracture splitting material into an empty mold cavity obtained after the removal of the spacer to form a fracture splitting material region, and metallurgically bonding the fracture splitting material with the material of the connecting rod body and the connecting rod cap;

(D) forming a fracture splitting notch in the fracture splitting material region;

(E) by means of fracture splitting, separating the connecting rod body from the connecting rod cap by a fracture splitting apparatus in the fracture splitting material region, to form two fracture surfaces having staggered structures which are engaged to each other; and (F) positioning and accurately assembling through the engaged staggered structures on the two fracture surfaces.

When it is inconvenient to cast the connecting rod body and the connecting rod cap because the thickness of the fracture splitting material region is small and the spacer is too thin, the thickness of the spacer may be made larger than that of the fracture splitting material region of the connecting rod, which is solved in the following two ways:

in Step (C), after the spacer is removed from the mold cavity, a spacing between the connecting rod body and the connecting rod cap is adjusted, the thickness of the empty mold cavity in which the fracture splitting material region is to be formed is controlled to reach a predetermined thickness of the fracture splitting material region, and then the molten fracture splitting material is injected into the empty mold cavity to form the fracture splitting material region; and in Step (C), after the molten fracture splitting material is injected into the empty mold cavity obtained after the removal of the spacer, a spacing between the connecting rod body and the connecting rod cap is adjusted to extrude the fracture splitting material, and the thickness of the fracture splitting material region is controlled to reach the predetermined thickness of the fracture splitting material region to form the fracture splitting material region.

The present invention is also suitable for manufacturing connecting rods for high-power engines. When a blank of a fracture splitting connecting rod is to be manufactured, a jagged fracture splitting layer is provided in the fracture splitting region. Consequently, during fracture splitting, the connecting rod fractures along the fracture splitting layer to form obvious jagged structures, without requiring mechanically machining any fitting surfaces. Compared with a jagged connecting rod manufactured by the conventional machining methods, such a connecting rod has the advantages of less working procedures, low cost, high fitting accuracy, high quality stability and the like.

The present invention has the following advantages.

1. The present invention provides a new approach of manufacturing fracture splitting connecting rods. The selection range of material for fracture splitting connecting rods is expanded, and aluminum alloy, titanium alloy, 40Cr and other materials may be utilized to manufacture fracture splitting connecting rods; and the application of the connecting rod fracture splitting technology is boosted;

2. The double-metal fracture splitting connecting rod integrates the advantages of two types of material, thereby ensuring the performance of the main body of the connecting rod and meeting the requirements of fracture splitting division of the large end portion of the connecting rod.

3. Compared with the conventionally common methods for manufacturing connecting rods by mechanically sawing and grinding a bonding surface, the present invention simplifies the machining procedures of connecting rods, reduces investments of fine-finishing equipments and cutters, saves energy, and ensures a high yield.

4. This process is also suitable for manufacturing connecting rods for high-power engines. When a blank of a connecting rod is to be manufactured, a jagged fracture splitting layer is provided in the fracture splitting region. Consequently, during fracture splitting, the connecting rod fractures along the fracture splitting layer to form obvious jagged structures, without requiring machining any fitting surfaces. Compared with a jagged connecting rod manufactured by the conventional machining methods, such a connecting rod has the advantages of less working procedures, low cost, high fitting accuracy, high quality stability and the like.

5. According to the application scenarios and performance requirements of a connecting rod, a blank of the connecting rod may be forged thus to eliminate the casting defects, make the structure compact and improve the mechanical properties of the connecting rod.

In the figures: 1—Connecting rod body; 2—Fracture splitting interface; 3—Connecting rod cap; 4—Connecting bolt; 5—Fracture splitting layer; 6—Second casting system; 7—Separating plate; 8—First casting system; 9—Fracture splitting notch; and, 30—Jagged spacer.

DETAILED DESCRIPTION OF THE INVENTION

The present invention will be further described as below with reference to accompanying drawings by embodiments.

Figure 1:
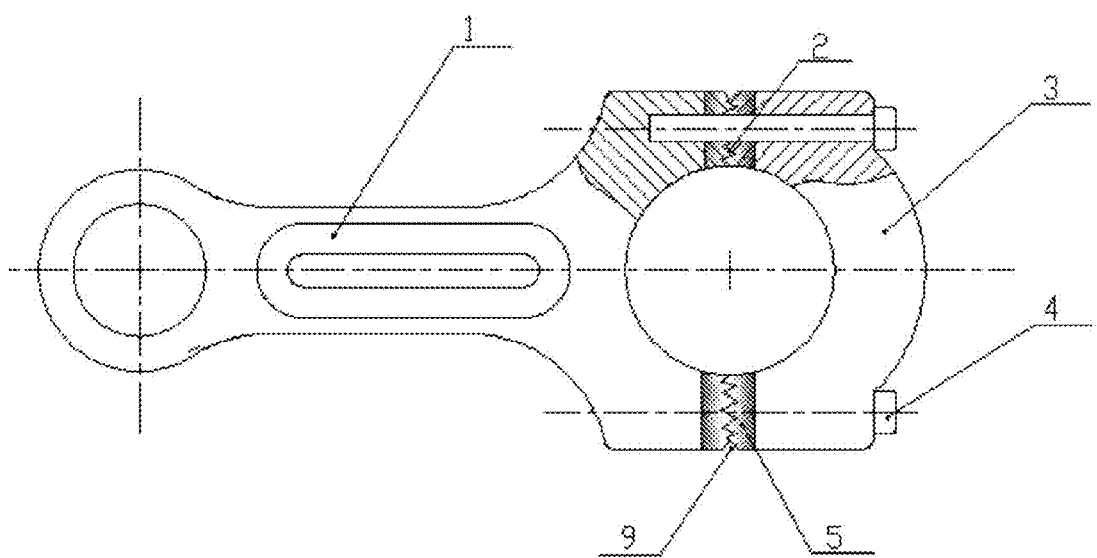
FIG. 1 is a structural diagram of a double-metal fracture splitting connecting rod.
Figure 2:
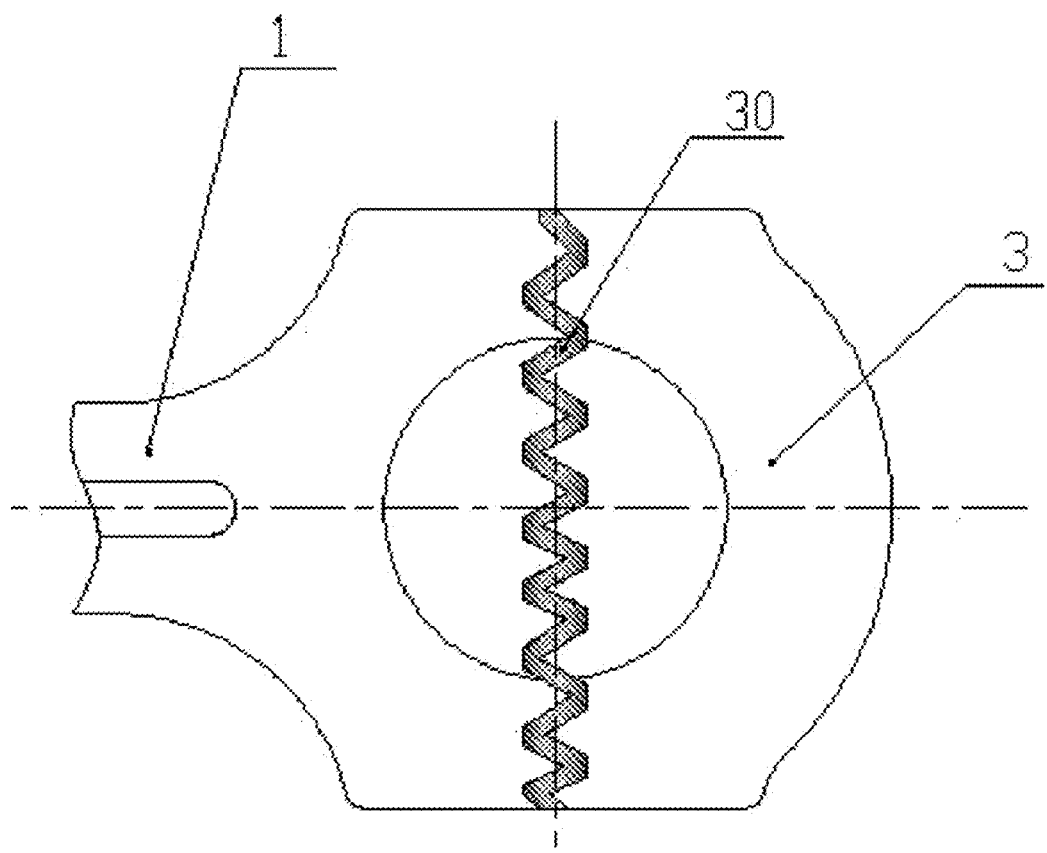
FIG. 2 is a schematic diagram of a connecting rod using a jagged spacer.

As shown in FIG. 1, a connecting rod in this embodiment consists of a connecting rod body 1 and a connecting rod cap 3, which are positioned and engaged by staggered structures on fracture splitting interfaces 2. The connecting rod body 1 and the connecting rod cap 3 are integrally connected by bolts 4.

Figure 3:
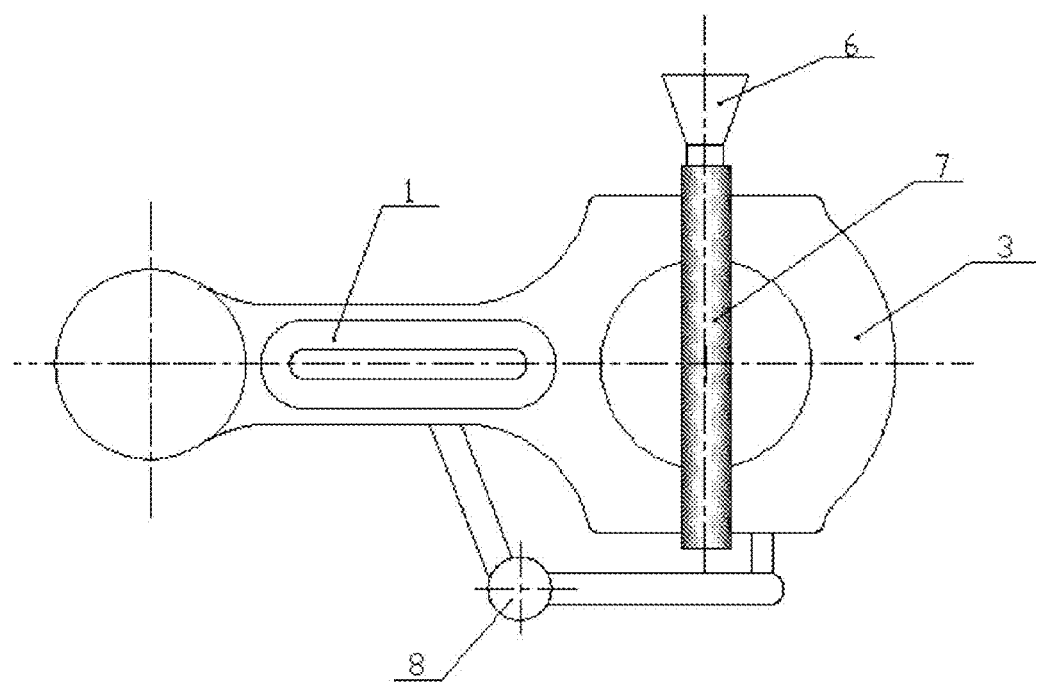
FIG. 3 is a flowchart of casting a composite double-metal fracture splitting connecting rod.

As shown in FIG. 1 and FIG. 3, the present invention employs the following technical solution. When a blank of a fracture splitting connecting rod is to be manufactured, a fracture splitting layer 5 is formed in a fracture splitting region and filled with material different from that for the main body of the connecting rod, and then fracture splitting machining is performed at the position of the fracture splitting layer 5. The specific method is as follows: the coordination of components of the material for the connecting rod is designed first; then, two independent casting systems are used, that is, the material for the main body of the connecting rod, having high-strength, high-toughness and anti-fatigue performance, is injected into the connecting rod body 1 and the connecting rod cap 3 by a first casting system 8, and then the fracture splitting material is injected into an empty mold cavity in the fracture splitting region by a second casting system 6. The two metals are metallurgically bonded. The resulting integral composite connecting rod has excellent comprehensive performance. Furthermore, the fracture splitting layer 5 at the large end portion of the connecting rod becomes brittle due to an external force, so that the connecting rod meets the technical requirements of the fracture splitting machining.

The material selection in this embodiment is as follows: the material for the main body of the connecting rod: LD10 aluminum alloy; the brittle material for the fracture splitting region: A 390 high-silicon aluminum alloy; and the interface contact area: 50×80 mm$^2$.

Composition of Alloy

| | Content of Elements (percentage by nominal weight, %) | | | | | |
|---|---|---|---|---|---|---|
| No. | Aluminum (Al) | Magnesium (Mg) | Zinc (Zn) | Manganese (Mn) | Silicon (Si) | Copper (Cu) |
| LD10 | Remaining | 0.4-0.8 | 0.3 | 0.4-1 | 0.6-1 | 3.9-4.8 |
| A390 | Remaining | 0.45-0.65 | >0.1 | <0.1 | 16-18 | 4-5 |

The following shows key process steps of manufacturing a composite connecting rod by the above mold device:

1) two metals to be compounded are smelted, respectively, refined, and then degassed and purified;

2) the surface of the spacer 7 to come into contact with molten metal is pretreated: greasy dirt, impurities and other deposits on the surface, which are disadvantageous for metal compounding, are removed by means of liquid immersion (such as, with acid, alkali or alcohol), and the surface is then preheated at 100-300° C.; and the mold is preheated to 240-280° C. and a release agent is spray-coated inside the mold cavity;

4) the molten LD10 alloy is injected into the mold cavity of the connecting rod body 1 and the connecting rod cap 3, the spacer 7 is driven by a transmission mechanism to exit the mold cavity along a concave cavity after the majority of molten LD10 alloy is solidified, and the molten A390 alloy is then injected into the empty mold cavity, where the casting temperature of the LD10 aluminum alloy is 730-760° C. and the casting temperature of the A390 high-silicon aluminum alloy is 690-710° C.;

6) after the casting is cleaned, heat treatment is performed for the composite casting according to specific conditions; by further heat treatment, diffusion between atoms at the interface or further metallurgical reaction may be facilitated, or, the interface structure may be adjusted, so that the bonding strength of the two metal layers is improved, where the temperature of the heat treatment is preferably 475-490° C. and the heat preservation time is preferably 12-14 hrs; and 7) the large end hole of the composite connecting rod is machined coarsely: a fracture splitting notch is formed at a position close to an intermediate plane of the fracture splitting layer at the large end portion of the composite connecting rod; then, by means of fracture splitting, the connecting rod body is completely separated from the connecting rod cap in the fracture splitting material region by a fracture splitting apparatus; positioning is performed by the engaged staggered structures on the two fracture surfaces; and, the connecting rod body 1 and the connecting rod cap 3 are integrally connected by bolts to form a finely finished product.

Upon analysis by experiments, it can be seen from a microstructure at the bonding interface that, an obvious metallurgical reaction occurs at the interface, the material on two sides is connected by the intermediate transition layer, and the bonding at the interface is tight without obvious cracks and pores. During fracture splitting, by applying an external load, the connecting rod has obvious crackability in its fracture splitting layer, and the fracture surfaces are controlled within the region of the fracture splitting layer, thereby effectively reducing the problems such as torn single-side, fracture splitting insufficiency, deformed large-end hole. Analysis on the quality of the fracture surfaces indicates that the fracture surfaces are flat from a macroscopic perspective, and the two fracture surfaces have naturally staggered structures from a macroscopic perspective, so that the connecting rod body and the connecting rod cap may be positioned and accurately assembled.

The method in the present invention for providing a fracture splitting layer in a blank of a part with composite double-metals is also suitable for machining parts having structures and process flows similar to connecting rod holes, for example, the fracture splitting machining of bearing seats for engine crankcases. Various deductions and replacements, which may be made without departing from the idea of the present invention, shall be regarded as falling into the patent protection scope defined by the submitted claims of the present invention.

The invention claimed is:

1. A method for manufacturing a composite bimetallic fracture splitting connecting rod, wherein the connecting rod comprises a connecting rod body, a connecting rod cap, and a fracture splitting layer disposed between the connecting rod body and the connecting rod cap, wherein the connecting rod body and the connecting rod cap comprises a first material, the fracture splitting layer comprises a second material, the method comprising:
(A) providing a spacer inside a mold of the connecting rod at a position where the connecting rod body and the connecting rod cap are adjacent to each other, wherein the spacer is a corrugated sheet;
(B) casting the first material into the mold to form the connecting rod having the spacer disposed therein;
(C) removing the spacer from the connecting rod when a majority of the first material solidifies, creating a cavity inside the connecting rod, wherein a shape of the cavity corresponds to the shape of the spacer;
(D) injecting the second material into the cavity, wherein the second material forms the fracture splitting material layer inside the cavity, the fracture splitting material layer bonds to the connecting rod;
(E) forging the connecting rod having the fracture splitting material layer;
(F) forming a fracture splitting notch in the fracture splitting layer;
(G) fracture-splitting the connecting rod to separate the connecting rod body from the connecting rod cap at the fracture splitting layer, wherein the resulting connecting rod body has a first jagged surface and the resulting connecting rod cap has a second jagged surface; and
(H) assembling the connecting rod body and the connecting rod cap by mating together the first jagged surface and the second jagged surface, wherein a joint between the first jagged surface and the second jagged surface is in a shape corresponding to the shape of the spacer.

2. The method according to claim 1, further comprising, between Step (C) and Step (D), adjusting a thickness of the cavity created by the removal of the spacer to a predetermined value.

3. The method according to claim 1, furthering comprising, between Step (D) and (E), compressing the fracture splitting material layer so that a thickness of the fracture splitting material layer reaches a predetermined value.

4. The method according to claim 1, wherein the fracture splitting material layer has a thickness ranging from 1 mm to 20 mm.

5. The method according to claim 1, wherein the injection of the second cavity is carried out by gravity or by applying a pressure.

6. The method according to claim 1, wherein the first material is an aluminum alloy, a titanium alloy, or an alloy steel.

7. The method according to claim 6, wherein the aluminum alloy is LD10 aluminum alloy and the alloy steel is Cr40.

8. The method according to claim 1, wherein the second material is a brittle material.

9. The method according to claim 8, wherein the second material is A390 high-silicon aluminum alloy.

\* \* \* \* \*